(12) United States Patent
Fields et al.

(10) Patent No.: US 9,772,853 B1
(45) Date of Patent: Sep. 26, 2017

(54) DISPATCHING A UNIT OF WORK TO A SPECIALTY ENGINE OR A GENERAL PROCESSOR AND EXCEPTION HANDLING INCLUDING CONTINUING EXECUTION UNTIL REACHING A DEFINED EXIT POINT OR RESTARTING EXECUTION AT A PREDEFINED RETRY POINT USING A DIFFERENT ENGINE OR PROCESSOR

(75) Inventors: John F. Fields, Kihei, HI (US); Gregg Willhoit, Houston, TX (US)

(73) Assignee: Rocket Software, Inc, Waltham, MA (US)

( * ) Notice: Subject to any disclaimer, the term of this patent is extended or adjusted under 35 U.S.C. 154(b) by 1784 days.

(21) Appl. No.: 12/212,038

(22) Filed: Sep. 17, 2008

Related U.S. Application Data

(60) Provisional application No. 60/972,977, filed on Sep. 17, 2007.

(51) Int. Cl.
*G06F 9/30* (2006.01)
*G06F 9/38* (2006.01)

(52) U.S. Cl.
CPC .......... *G06F 9/3861* (2013.01); *G06F 9/3877* (2013.01)

(58) Field of Classification Search
CPC ..... G06F 9/3836; G06F 9/3861; G06F 9/3877
USPC ..... 712/34, 35, 214, 244; 718/100, 102, 104
See application file for complete search history.

(56) References Cited

U.S. PATENT DOCUMENTS

| | | | | |
|---|---|---|---|---|
| 4,758,950 A | * | 7/1988 | Cruess | G06F 9/3881 710/269 |
| 4,953,930 A | * | 9/1990 | Ramsey et al. | 385/14 |
| 5,197,138 A | * | 3/1993 | Hobbs | G06F 9/3889 712/222 |
| 5,915,117 A | * | 6/1999 | Ross et al. | 710/262 |
| 5,953,741 A | * | 9/1999 | Evoy et al. | 711/132 |
| 7,178,147 B2 | * | 2/2007 | Benhase et al. | 718/104 |
| 7,222,343 B2 | * | 5/2007 | Heyrman et al. | 718/100 |
| 7,624,257 B2 | * | 11/2009 | Kra | 712/228 |
| 2005/0022173 A1 | * | 1/2005 | Kanade | 717/140 |
| 2007/0130446 A1 | * | 6/2007 | Minakami | 712/34 |

* cited by examiner

*Primary Examiner* — David J Huisman
(74) *Attorney, Agent, or Firm* — Patent Law Works LLP

(57) ABSTRACT

A Logical Dispatchable Unit Engine identifies a unit of work to be executed. The Logical Dispatchable Unit Engine determines whether the unit of work is to be dispatched to a general processor or a specialty engine based on characteristics associated with the unit of work, instructions associated with the unit of work and/or restrictions associated with the unit of work. The Logical Dispatchable Unit Engine communicates with an Operating System kernel to dispatch the unit of work for execution, responsive to determining whether the unit of work is to be dispatched to a general processor or a specialty engine.

34 Claims, 10 Drawing Sheets

DISPATCHING A UNIT OF WORK TO A SPECIALTY ENGINE OR A GENERAL PROCESSOR AND EXCEPTION HANDLING INCLUDING CONTINUING EXECUTION UNTIL REACHING A DEFINED EXIT POINT OR RESTARTING EXECUTION AT A PREDEFINED RETRY POINT USING A DIFFERENT ENGINE OR PROCESSOR

CROSS REFERENCE TO RELATED APPLICATIONS

This application claims priority under 35 U.S.C. §119(e) from U.S. Provisional Patent Application No. 60/972,977, titled "Hybrid SRB/TCB Logical Dispatchable Unit," filed Sep. 17, 2007, which is incorporated by reference herein in its entirety.

BACKGROUND OF THE INVENTION

1 Field of the Invention

This invention pertains in general to a system for dispatching units of work in multi-threaded computer systems. Specifically, this invention pertains to a system used to dispatch units of work to general processors and specialty engines.

2 Description of the Related Art

A service-oriented architecture, herein referred to as a "SOA," is an underlying structure supporting communications between computing entities. A SOA defines how two computing entities, such as programs, interact in such a way as to enable one entity to perform a unit of work on behalf of another entity. A "unit of work," as used herein, refers to a unit of work required for the execution of a computing entity such as a computer system, program or a function. In most instances, a unit of work is unit of executable code in the form of one or more instructions or transactions to be executed by a processor. Computing entities comprise of threads, where a thread is set of one or more units of work that are performed sequentially. A multi-threaded computing entity is composed of one or more threads.

In SOAs, interactions between computing entities are defined using a description language. Each interaction defined using the description language is self-contained and loosely coupled to other interactions, so that each interaction is independent of any other interaction and underlying technologies such as computing systems, operating systems or programming languages.

A mainframe computer is a large computing system capable of performing hundreds to thousands of units of work simultaneously. Because of the above discussed independence, SOAs have enabled mainframe computers to participate in cross-platform environments. This participation is especially beneficial because legacy software applications are operable only on mainframe computers. Accordingly, SOAs allow for the development of programs which interact with legacy software applications on mainframe computers.

Specialty engines have been developed in order to optimize performance of mainframe computers used in conjunction with SOAs. Specialty engines are specialized processors which are optimized to execute specific units of work. A specific unit of work, as defined herein, refers to a unit of work that has been optimized to execute on a specific processor due to specific characteristics of the unit of work. The specialized units of work may be optimized based on the programming language (e.g. Java), the operating system (e.g. Linux) or the type of function performed by the unit of work (e.g. XML parsing). For example, specialty engines developed by IBM to optimize processing include: the System z9 Integrated Information Processor (zIIP), the System z Application Assist Processor (zAAP), the Integrated Facility for Linux (IFL) and the Internal Coupling Facility (ICF).

Specialty engines lower the total cost of ownership of the mainframe computer. Cost of ownership of mainframe computers is typically defined as the hardware, software and salary costs associated with units of work performed by the mainframe computer. By using the specialty engines to execute units of work, specialized units of work are diverted from the general processors at the mainframe, increasing the availability of the general processors for executing units of work that can only be processed by the general processor computing capability. This increase in availability reduces the hardware costs associated with buying extra general processors. Units of work deployed to the specialty processors are also not subject to the restrictions in performance or "throttle" effects of the general processors and thus can be performed more efficiently.

Although specialized engines provide many benefits, computing entities such as software applications are often comprised of both specialized units of work and units of work can only be processed by general processors. Accordingly, there is a need in the art for systems which effectively perform both specialized units of work and units of work that can only be processed by general processors.

BRIEF SUMMARY

The above and others needs are addressed by methods, computer program products and systems for dispatching units of work to general processors and specialty processors.

An embodiment of a method according to the present invention comprises a computer-implemented method of dispatching units of work to processors for execution. A logical dispatchable unit (LDU) engine identifies a unit of work to be executed. Then the LDU determines whether the unit of work is to be dispatched to a general processor or a specialty engine. The LDU communicates with the operating system kernel to dispatch the unit of work for execution, responsive to the LDU's determination of whether the unit of work is to be dispatched to a general processor or a specialty engine.

In one embodiment, a system including the present invention comprises a logical dispatchable unit engine, memory, one or more general processors, one or more specialty engines and an operating system kernel. The logical dispatchable unit engine is adapted to communicate with the operating system to dispatch units of work to the one or more general processors and the one or more specialty engines for execution.

The present invention also comprises a computer readable storage medium comprising executable program code for a logical dispatchable unit engine. The program code comprises program code for identifying a unit of work to be executed; for determining whether the unit of work is to be dispatched to a general processor or a specialty engine; and for communicating with an operating system kernel to dispatch the unit of work for execution, responsive to determining whether the unit of work is to be dispatched to a general processor or a specialty engine.

The features and advantages described in this summary and the following detailed description are not all-inclusive. Many additional features and advantages will be apparent to

Figure 1:
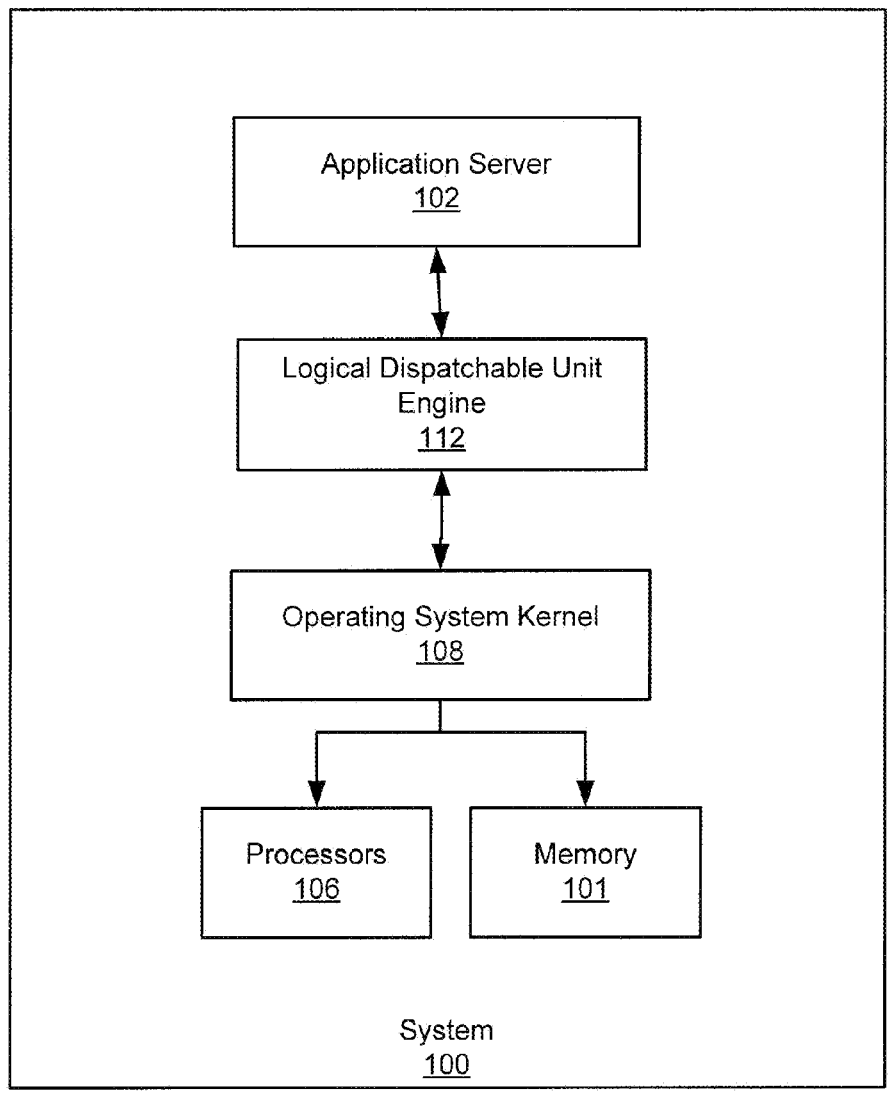
FIG. 1 is a high-level block diagram illustrating a computing system adapted to execute a Logical Dispatchable Unit Engine according to one embodiment.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE DRAWINGS

A logical dispatchable unit engine 112 is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to FIG. 1.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the context of different architectures and some of the components are operable in all architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD ROMs, and magnetic optical disks, read only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to any particular programming language. It will be appreciated that a variety of programming languages may be used to implement the teachings of the invention as described herein.

FIG. 1 is a high-level block diagram illustrating a computing system 100 including a Logical Dispatchable Unit Engine (LDU) 112 according to one embodiment.

The system 100 comprises a plurality of processors 106 and a memory 101. The system 100 is adapted to execute an Operating System kernel 108, a LDU Engine 112 and an application server 102. For convenience and ease of understanding only one LDU Engine 112 is illustrated. Alternate embodiments of the system 100 are adapted to execute multiple LDU Engines 112.

In one embodiment, the system 100 is a mainframe computer. A mainframe computer, as defined herein, refers to a large multi-processor computing system capable of performing hundreds to thousands of units of work simultaneously. In alternate embodiments, the system 100 may be another type of system comprising multiple processors 106 such as a client system, a system devoted to running server applications (i.e. a "server computer") or a supercomputer system. For convenience and ease of understanding, the majority of the discussion herein is directed to embodiments in which the system 100 is a mainframe computer, however the present invention may be used in any other computing system.

The Operating System kernel 108 is adapted to communicate with the memory 101 and the processors 106. The Operating System kernel 108 functions to allocate the system 100 resources such as the memory 101 and processors 106 to computing entities.

The application server 102 communicates with computing entities (not shown) such as software applications, functions and entities comprising executable code. The application server 102 performs services for computing entities such as executing threads or units of work. In a specific embodiment, the application server 102 communicates with the computing entities to receive threads or units of work using communications protocols specific to service oriented architectures (SOA). The application server 102 communicates with the LDU Engine 112 to transmit units of work to the LDU Engine 112. In some embodiments, the application server 102 transmits threads of sequential units to the LDU Engine 112. In some embodiments, the application server 102 transmits threads of work from multiple computing entities or multi-threaded computing entities to multiple LDU Engines 112.

The LDU Engine 112 is adapted to communicate with the Operating System kernel 108 and the application server 102. The LDU Engine 112 identifies units of work and dispatches the units of work to the processors 106 for execution. The LDU Engine 112 communicates with the application server 102 to receive units of work. In one embodiment, the LDU Engine 112 receives units of work as threads of sequential units of work. The LDU Engine 112 communicates with the Operating System kernel 108 to dispatch the units of work to the processors 106 for execution.

Figure 2:
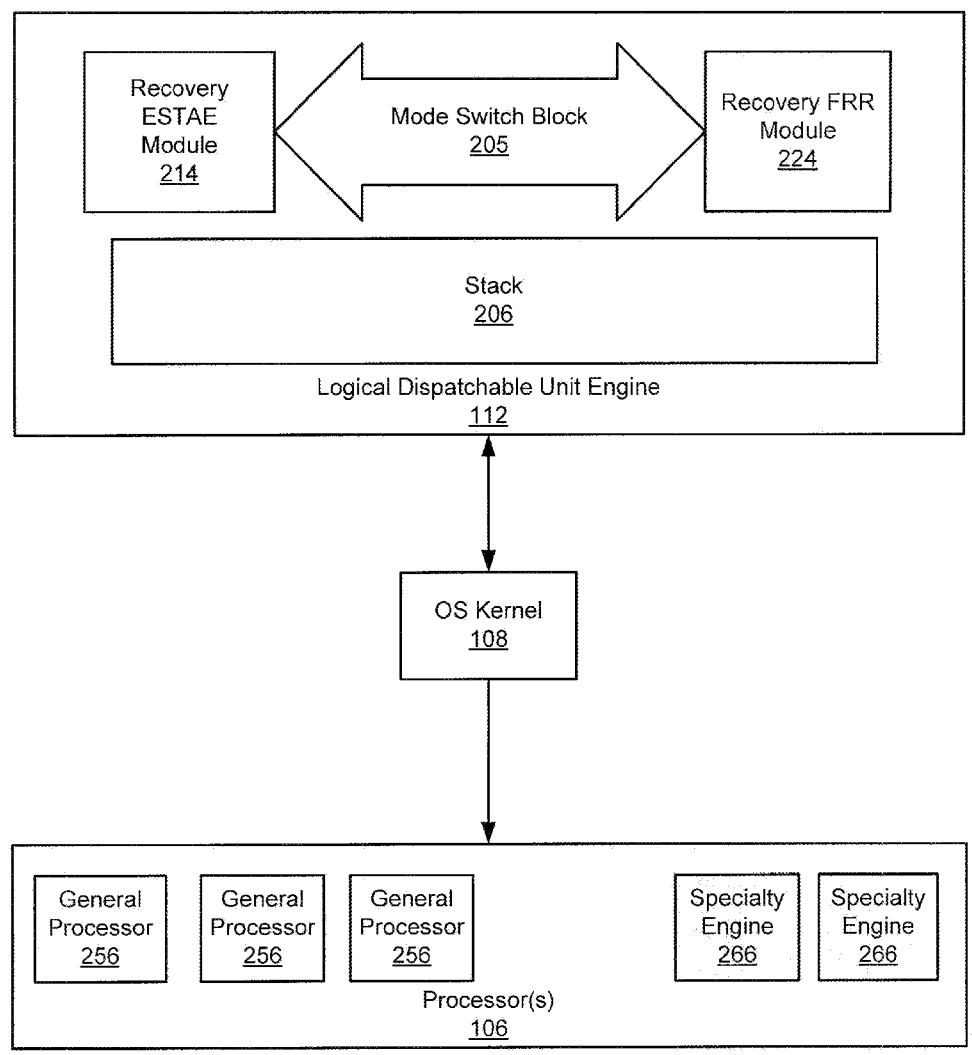
FIG. 2 is a block diagram illustrating a computing system adapted to execute a Logical Dispatchable Unit Engine according to one embodiment.

FIG. 2 is a block diagram illustrating the computing system 100 with the LDU Engine 112 shown in more detail according to one embodiment. As shown in FIG. 2, the LDU Engine 112 includes several modules. Those of skill in the art will recognize that other embodiments of the LDU Engine 112 can have different and/or other modules than the ones described here, and that the functionalities can be distributed among the modules in a different manner.

As discussed above, the system 100 comprises a plurality of processors 106. The processors 106 comprise one or more general processors 256 and one or more specialty engines 266. A general processor 256 is a processor that can execute units of work but is not optimized to execute specialized units of work. A specialty engine 266 is a processor that is optimized to execute specific units of work based on characteristics of the unit of work but is not able to execute all units of work. For example, the characteristics of the unit of work may be based on a programming language (e.g. Java), an operating system (e.g. Linux) or the type of function (e.g. XML parsing) associated with the unit of work.

The LDU Engine 112 comprises a stack 206, a Mode Switch Block 205 a Recovery Extended Specify Task Abnormal Exit (ESTAE) Module 214 and a Recovery Functional Recovery Routine (FRR) Module 224. The LDU Engine 112 communicates with the application server 102 (not shown in FIG. 2) to receive units of work to be executed. The stack 206 is a data structure which acts as "working memory" to store data associated with the units of work that are being executed. The LDU Engine 112 stores data associated with the units of work such as run-time environment information in the stack 206 while the units of work are being executed and removes the data from the stack 206 once the units of work have been executed.

The LDU Engine 112 receives units of work to be executed from the application server 102 (not shown). The LDU Engine 112 determines whether the units of work are to be executed by the general processors 256 or the specialty engines 266. Specifically, the LDU Engine 112 determines whether the units of work must be executed by the general processors 256. The LDU Engine 112 determines whether the units of work must be executed by the general processors 256 based on a characteristics associated with the units of work (e.g. data associated with the unit of work, a programming language associated with the unit of work), instructions associated with the units of work (e.g. a command associated with the unit of work, a flag associated with the unit of work) and/or restrictions associated with the units of work (e.g. legal restrictions). In some embodiments, the LDU Engine 112 determines whether the units of work must be executed by the general processors 256 by determining whether exceptions occur when the LDU Engine 112 dispatches the units of work to specialty engines 266 for execution.

The determination of whether the units of work must be executed on the general processors 256 allows the LDU Engine 112 to dispatch units of work to the specialty engines 266 whenever the units of work can be executed by the specialty engines 266, thus optimizing the execution of the units of work whenever possible. By dispatching the units of work to the general processors 256 only when necessary, the LDU Engine 112 further optimizes the execution of the units of work executed by the general processors 256 by reducing the volume of units of work dispatched to the general processors 256.

Based on this determination, the LDU Engine 112 switches between modes of operation to dispatch the unit of work for execution. Two modes of operation are described herein: a first mode of operation in which the LDU Engine 112 dispatches units of work to the one or more general processors 256 and a second mode of operation in which the LDU Engine 112 dispatches units of work to the one or more specialty engines 266. The LDU Engine 112 communicates with the Operating System kernel 108 to dispatch units of work to general processors 256 and the specialty engines 266 for execution according to the mode of operation.

The LDU Engine 112 further stores data elements used to monitor the units of work once they have been dispatched to the general processors 256 and/or the specialty engines 266 for execution. The Mode Switch Block 205 comprises data elements and modules used by the LDU Engine 112 to switch between modes of operation.

The Recovery ESTAE Module 214 and a Recovery FRR Module 224 are adapted to communicate with the Mode Switch Block 205 and the Stack 206. The Recovery ESTAE Module 214 and the Recovery FRR Module 224 are adapted to perform recovery procedures when exceptions occur in association with units of work. An exception is an error that occurs when executing a series of instructions that disrupts the complete execution of the series of instructions. A recovery procedure is a procedure which attempts to correct the error by recovering information associated with the series of instructions or re-trying the series of instructions.

The Recovery FRR Module 224 functions to perform recovery procedures when an exception occurs while the LDU Engine 112 is operating in the second mode of operation in which the LDU Engine 112 dispatches the units of work to the specialty engines 266. The Recovery ESTAE Module 214 functions to perform recovery procedures when an exception occurs while the LDU Engine 112 is operating in the first mode of operation in which the LDU Engine 112 dispatches units of work to the general processors 256.

Figure 3:
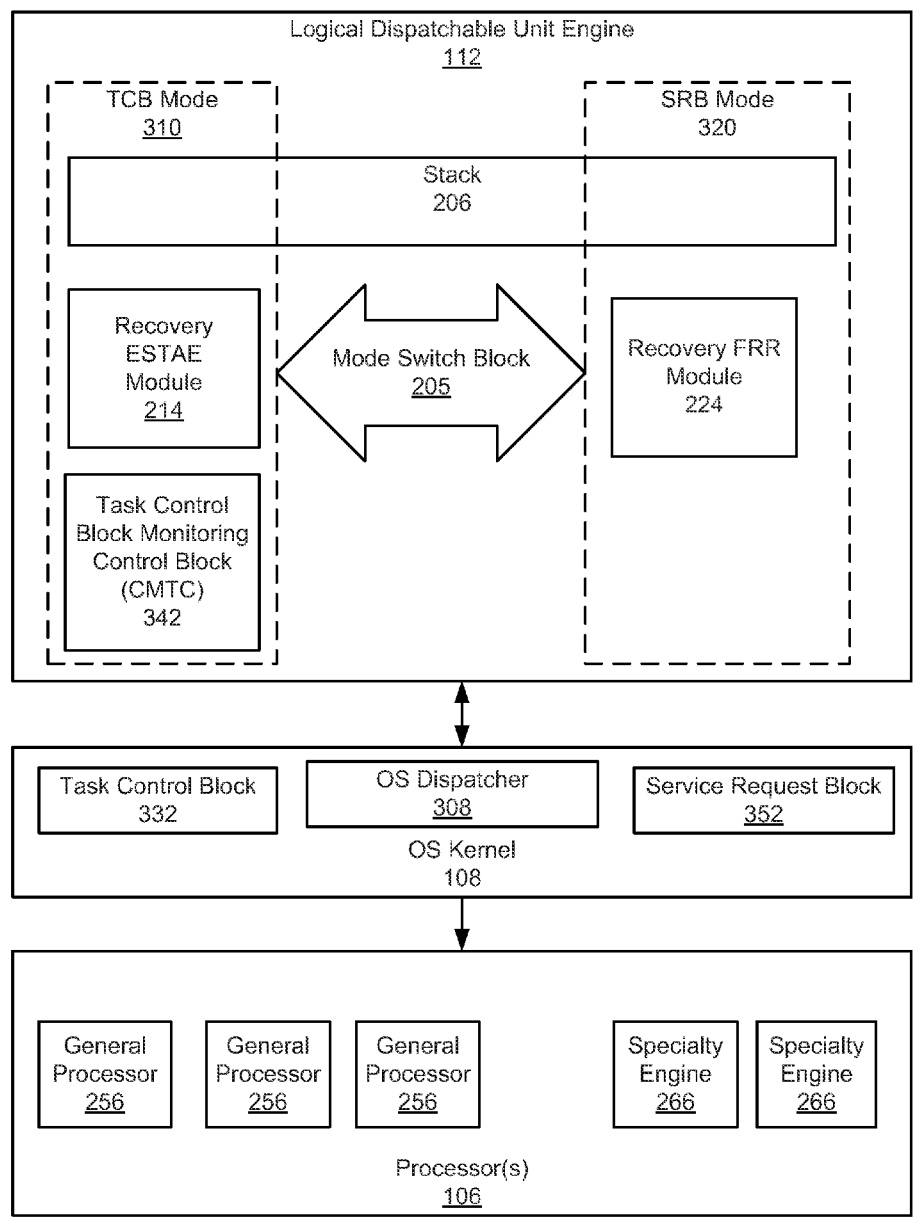
FIG. 3 is a block diagram illustrating a computing system adapted to execute a Logical Dispatchable Unit Engine according to a specific embodiment.

FIG. 3 is a block diagram illustrating a computing system 100 adapted to execute the LDU Engine 112 according to a specific embodiment. As shown in FIG. 2, the LDU Engine 112 includes several modules. In this embodiment, the LDU Engine 112 comprises a Recovery ESTAE Module 214, a Recovery FRR Module 224, a Mode Switch Block 205, a Stack 206 and a Task Control Block Monitoring Block 342. Those of skill in the art will recognize that other embodiments of the LDU Engine 112 can have different and/or other modules and blocks than the ones described here, and that the functionalities can be distributed among the modules in a different manner.

In one embodiment, the Operating System kernel 108 is the z/OS™ Operating System kernel developed by International Business Machines Corporation (IBM) and the system 100 is a mainframe computer system such as a system that is compatible with the IBM System/360 line. For ease of description, the majority of the discussion herein is directed to this specific embodiment. Methods of implementing the features of the LDU Engine 112 using other Operating System kernels 108 and/or types of systems 100 will be apparent to those skilled in the art in light of this disclosure. The Operating System Kernel 108 comprises an OS Dispatcher 308 which communicates with the LDU Engine 112 to dispatch units of work to the processors 106.

In this embodiment, the general processors 256 are general processors 256 compatible with the z/OS™ Operating System kernel 108. The specialty engines 266 are system Z™ specialty engines 266 such as those developed by IBM. In this embodiment, the specialty engines 266 are System z9 Integrated Information Processors (zIIP), System z Application Assist Processors (zAAP), Integrated Facility for Linux (IFL) processors, Integrated Coupling Facility (ICF) Processors or any combination thereof.

TCB mode 310 is a mode of operation of the LDU Engine 112 in which the LDU Engine 112 dispatches units of work to the general processor 256. In TCB Mode 310, the Operating System kernel 108 allocates a task control block 332 from memory 101. The Operating System kernel 108 uses the data elements in the task control block 332 to dispatch units of work to the general processors 256. In one embodiment, for each unit of work, the task control block 332 specifies an identifier for the unit of work, a register value for the unit of work, address information for the unit of work, a priority for executing the unit of work, accounting information specifying when the unit of work was last run and the amount of processor time used by the unit of work and a pointer to a next unit of work to be executed.

When the LDU Engine 112 is in TCB mode 310, the LDU Engine 112 identifies units of work from the stack 206 and communicates with the Operating System kernel 108 to dispatch the units of work to the general processors 256 for execution. The Operating System kernel 108 allocates and initializes a task control block 332 for the unit of work. The LDU Engine 112 identifies the task control block 332 and generates a task control block monitoring control block (CMTC) 342 based on the task control block 332. The CMTC 342 monitors the execution of the unit of works dispatched to the general processors 256 based on the data elements stored in the task control block 332.

The Recovery ESTAE Module 214 is adapted to execute when the LDU Engine 112 is in TCB mode 310. The Recovery ESTAE Module 214 communicates with the Operating System kernel 108 to identify exceptions associated with units of work that are dispatched to the general processors 256 for execution. If the Recovery ESTAE Module 214 identifies an exception, the Recovery ESTAE Module 214 communicates with the Operating System kernel 108 to evaluate the exception associated with the unit of work and perform a recovery procedure. Depending on the exception associated with the unit of work, Recovery ESTAE Module 214 may communicate with the Operating System kernel 108 to determine whether to restart a series of instructions associated with the unit of work at defined retry point in the series of instructions. The Recovery ESTAE Module 214 may also communicate with the Operating System kernel 108 to determine whether to "percolate" an exception associated with a unit of work by continuing to execute the series of instructions until a defined exit point in the series of instructions.

SRB mode 320 is a mode of operation of the LDU Engine 112 in which the LDU Engine 112 dispatches units of work to the specialty engines 266. In SRB mode 320, the LDU Engine 112 identifies specialized units of work from the stack 206 and communicates with the operating system dispatcher 232 to dispatch the specialized units of work to the specialty engines 266. The LDU Engine 112 communicates with the Operating System kernel 108 to generate Service Request Blocks (SRBs) 352 for units of work. A SRB 352 is a data structure containing data elements specific to a specialized unit of work to be dispatched. According to an embodiment, the SRB 352 comprises any or all of the data elements stored in the task control block 332.

The Recovery FRR Module 224 is adapted to execute when the LDU Engine 112 is in SRB mode 320. The Recovery FRR Module 224 communicates with the Operating System kernel 108 to identify exceptions associated with units of work that are dispatched to the specialty engines 266 for execution. If the Recovery FRR Module 224 identifies an exception, the Recovery FRR Module 224 communicates with the Operating System kernel 108 to evaluate the exception associated with the unit of work and perform a recovery procedure. Depending on the exception associated with the unit of work, Recovery FRR Module 224 may communicate with the Operating System kernel 108 to determine whether to restart a series of instructions associated with the unit of work at defined retry point in the series of instructions. The Recovery FRR Module 224 may also communicate with the Operating System kernel 108 to determine whether to "percolate" an exception associated with a unit of work by continuing to execute the series of instructions until a defined exit point in the series of instructions.

While the majority of discussion herein is directed to embodiments where the units that can be executed by the specialty engines are executed by the specialty engines 266, it is worthwhile to note the units of work that can be executed by the specialty engines 266 may also be executed by the general processors 256. Therefore, it is possible for the LDU Engine 112 to dispatch a unit of unit to the general processor 256 while in SRB Mode 320. Conversely, some units of work may only be executed by the general processors 256. If a unit of work that can only be executed by a general processor is dispatched to a specialty engine 266 while the LDU Engine 112 is in SRB Mode 320, an exception will occur. If such an exception occurs, the LDU Engine 112 switches from SRB Mode 320 to TCB Mode 310. The LDU Engine 112 then "retries" the unit of work by dispatching the unit of work which caused the exception to the general processors 256 in TCB Mode 310. The LDU Engine 112 switches back to SRB Mode 320 once the unit of work has been executed.

The LDU Engine 112 further generates and stores data elements used to track execution of the dispatched specialized units of work such as pointers to SRBs 352 in the Mode Switch Block 205. Data elements used to monitor execution of the specialized units of work are discussed below with respect to FIG. 4. The LDU Engine 112 communicates with the operating system dispatcher 232 to monitor execution of the specialized units of work and update the data elements used to monitor execution of the specialized units of work stored in the Mode Switch Block 205.

Figure 4:
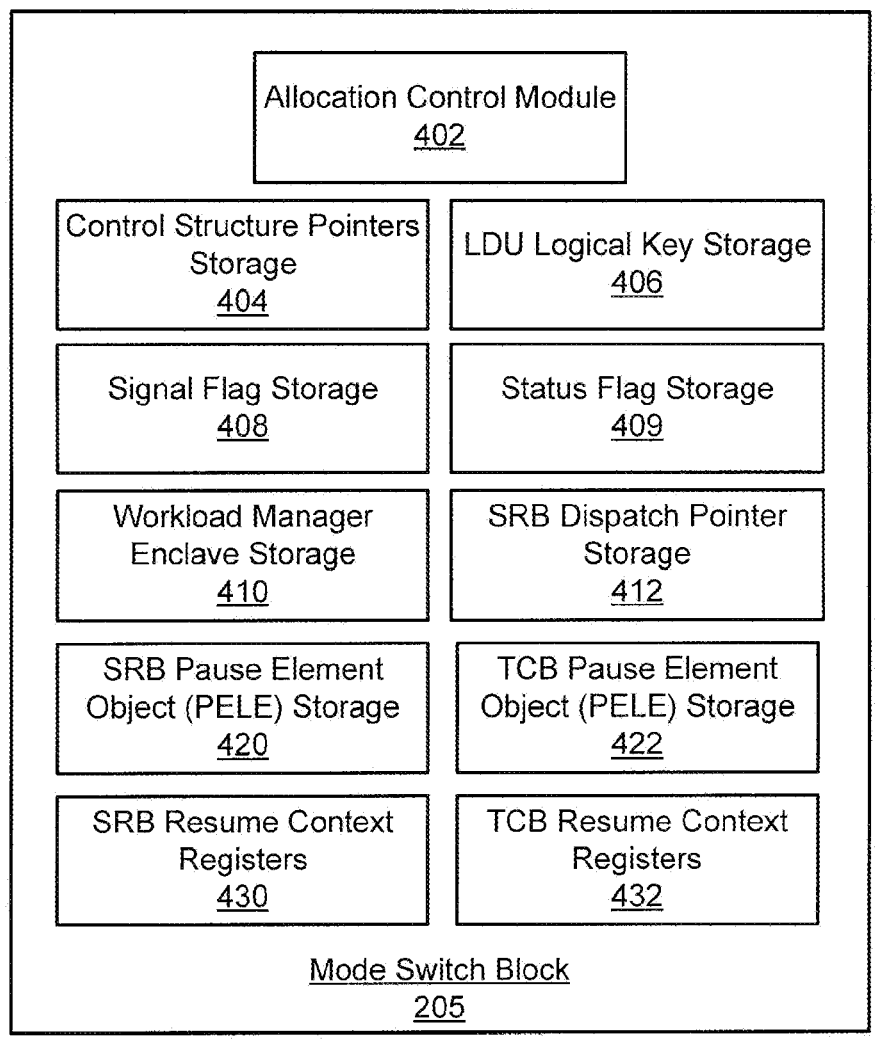
FIG. 4 is a high-level block diagram illustrating the Mode Switch Block according to one embodiment.

FIG. 4 is a high-level block diagram illustrating the Mode Switch Block 205 according to one embodiment. As shown in FIG. 4, the Mode Switch Block 205 comprises several data elements and modules that are initialized and updated by the LDU Engine 112. In the illustrated embodiment, the Mode Switch Block comprises an Allocation Control Module 402, a Control Structure Pointers Storage 404, an LDU Logical Key Storage 406, a Signal Flag Storage 408, a Status Flag Storage 409, a Workload Enclave Manager Storage 410, a SRB Dispatch Pointer Storage 412, an SRB Pause Element Object Storage 420, a TCB Pause Element Object Storage 422, SRB Resume Context Registers 430 and TCB Resume Context Registers 432. Those of skill in the art will recognize that other embodiments of the LDU Engine 112 can comprise different data elements and/or other modules than the ones described here, and that the functionalities can be distributed among the data elements and/or modules in a different manner.

The Allocation Control Module 402 is used to allocate memory 101 to store the stack 206 and data elements in the Mode Switch Block 205. The LDU Engine 112 executes the Allocation Control Module 402 during initialization of the Mode Switch Block 205. The Allocation Control Module 402 communicates with the Operating System kernel 108 to allocate a portion of memory 101 from available memory 101 (e.g. free blocks of memory).

The Control Structure Pointers Storage 404 is used to store control structure pointers that indicate the addresses in memory 101 of the stack 206 and other control structures stored by or associated with the Mode Switch Block 205. In one embodiment, the Control Structure Pointers Storage 404 stores a pointer to the address in memory 101 of the task control block 332 and the CMTC 342. The LDU Engine 112 uses the control structure pointers stored in the Control Structure Pointers Storage 404 to retrieve information associated with the task control block 232 and the CMTC 342.

The LDU Logical Key Storage 406 is used to store a logical key data element which uniquely identifies the LDU Engine 112. In one embodiment, the LDU Logical Key Storage 406 stores a logical key data element comprising a 16-byte opaque identity key for the LDU Engine 112. The LDU Engine 112 uses the logical key data element stored in the LDU Logical Key Storage 406 to communicate with external computing entities such as the Application Server 102. In a specific embodiment, the logical key data element comprises an address of a task control block associated with the LDU Engine 112.

The Signal Flag Storage 408 stores a set of signal flag data elements used by the LDU Engine 112 to communicate with external computing entities to send and receive units of work. In one embodiment, the LDU Engine 112 updates the signal flag data elements to indicate whether the LDU Engine 112 is available to receive units of work from the Application Server 102. In one embodiment, the Status Flag Storage 409 stores status flags that indicate whether the LDU Engine 112 is operating in TCB mode 310 or SRB mode 320 and whether the LDU Engine 112 is paused in either mode. The LDU Engine 122 updates the status flags when the LDU Engine 112 switches between TCB mode 310 and SRB mode 320. The LDU Engine 112 updates the status flags when the execution of a unit of work is paused in either mode.

The Workload Manager Enclave Storage 410 stores affinity data elements used by the LDU Engine 112 to dispatch units of work to the Operating System Dispatcher 232. The affinity data elements specify affinity information used to determine a specialty engine 266 to be used to perform a specialized unit of work. This affinity information may be based on an affinity to a Specialty Engine 266 associated with the Operating System Dispatcher 232.

The SRB Dispatch Pointer Storage 412 stores a set of dispatch pointers associated with specialized units of work. The LDU Engine 122 uses the dispatch pointers to monitor specialized units of work that have been dispatched to the specialty engines 266 and are being performed by the specialty engines 266.

The SRB Pause Element Storage 420 stores a pointer data element to a pause element data object for unit of work to be executed by a specialty processor. A pause data element object (PELE) is a data object that is used to pause, resume or transfer execution of a unit of work. The TCB Pause Element Storage 422 stores a pointer data element to a pause data element object for unit of work that is to be executed by the general processor 256. The LDU Engine 112 retrieves and updates the pause element data objects stored in SRB Pause Element Storage 420 and TCB Pause Element Storage 422 as it dispatches units of work.

The SRB mode resume context registers 430 and TCB mode resume context registers 432 are used to store run-time context information. The TCB mode resume context registers 432 are used by the LDU Engine 112 to restore the run-time context when the LDU Engine 112 switches from SRB mode to TCB mode. The SRB mode resume context registers 430 are used by the LDU Engine 112 to restore the run-time context when the LDU Engine 112 switches from TCB mode to SRB mode.

Figure 5A:
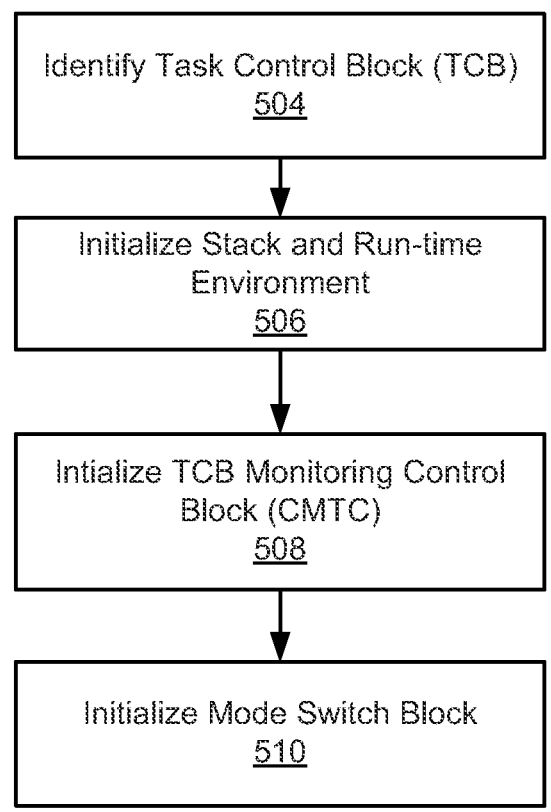
FIG. 5a and FIG. 5b are flow charts illustrating steps performed by the Logical Dispatchable Unit Engine to initialize the Mode Switch Block according to one embodiment.

FIG. 5*a* is a flow chart illustrating steps performed the LDU Engine 112 to initialize the Mode Switch Block 205 according to one embodiment. Other embodiments perform the illustrated steps in different orders, and/or perform different or additional steps. Moreover, some of the steps can be performed by engines or modules other than the LDU Engine 112.

The LDU Engine 112 identifies 504 that a task control block (TCB) 332 has been allocated by the Operation System kernel 108 and stores a pointer to the Task Control Block 332 in the Control Structure Pointers Storage 404. The LDU Engine 112 communicates with the Operating System kernel 108 to initialize 506 the stack 206 and the run-time environment. The LDU Engine 112 initializes 508 the CMTC 342 used to monitor the task control block 332 based on the data stored in the Task Control Block 332 and stores a pointers to the CMTC 342 in the Control Structure Pointers Storage 404. The LDU Engine 112 initializes 510 the Mode Switch Block 205.

Figure 5B:
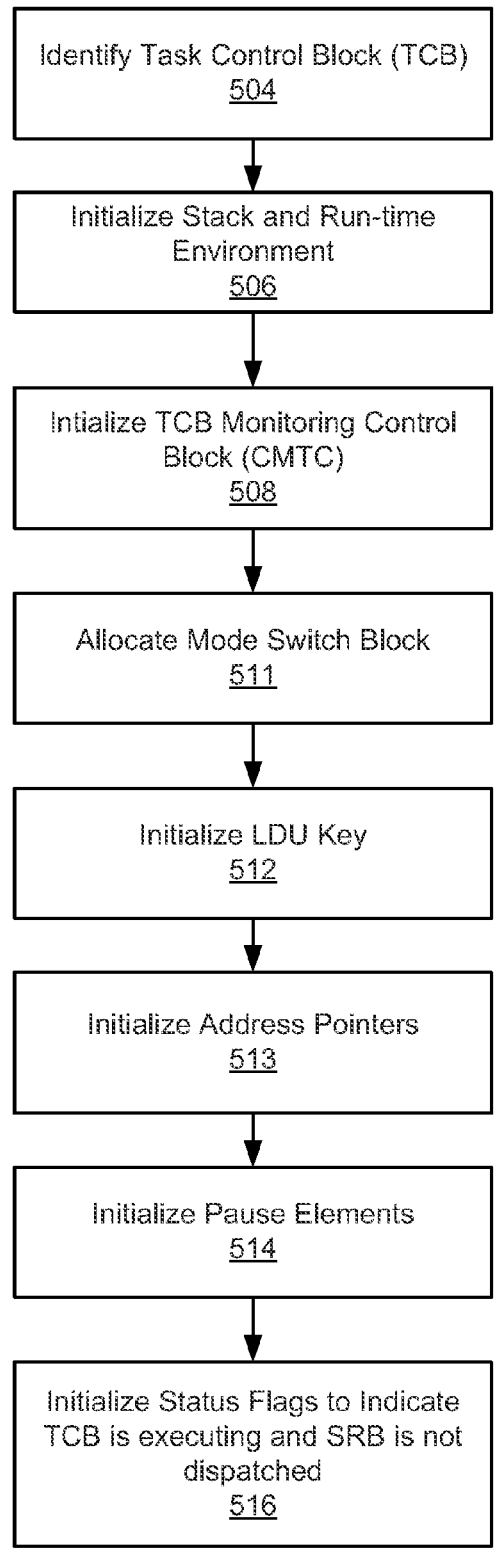

FIG. 5*b* is a flow chart illustrating steps performed by the LDU Engine 112 to initialize the Mode Switch Block 205 according to one embodiment. Other embodiments perform the illustrated steps in different orders, and/or perform different or additional steps. Moreover, some of the steps can be performed by engines or modules other than the LDU Engine 112.

The LDU Engine 112 performs the same steps described above with reference to FIG. 5a. The LDU Engine 112 allocates 511 a portion of memory 101 for the Mode Switch Block 205 by communicating with the Allocation Control Module 402. The LDU Engine 112 initializes 512 the logical key data element stored in the LDU Logical Key Storage 406. The LDU Engine 112 initializes 513 the address pointer data elements stored in the Control Structure Pointers Storage 404 to indicate the addresses of the stack 206, the task control block 332 and the CMTC 342. The LDU Engine 112 initializes 514 the pause element data objects stored in the SRB Pause Element Storage 420 and the TCB Pause Element Storage 422. The LDU Engine 112 initializes 516 the status flag data elements stored in the Status Flag Storage 409 to indicate that the LDU Engine 112 is dispatching units of work in TCB mode and to further indicate that units of work have not yet been dispatched in SRB mode.

Figure 6:
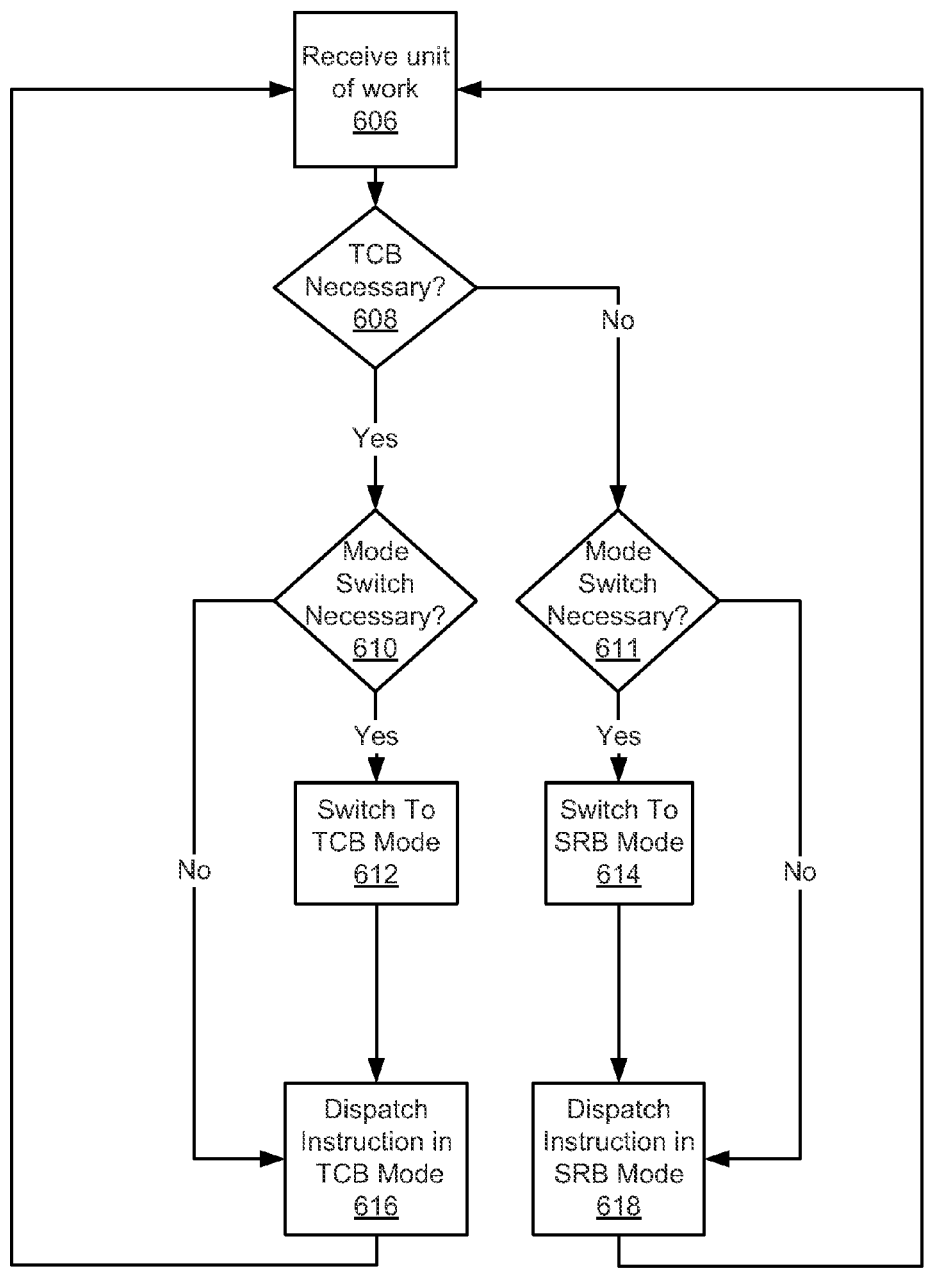
FIG. 6 is a flow chart illustrating steps performed by the Logical Dispatchable Unit Engine to dispatch units of work according to one embodiment.

FIG. 6 is a flow chart illustrating steps performed by the LDU Engine 112 to dispatch units of work according to one embodiment. Other embodiments perform the illustrated steps in different orders, and/or perform different or additional steps. Moreover, some of the steps can be performed by engines or modules other than the LDU Engine 112.

The LDU Engine 112 receives 606 the next unit of work to be performed from the application server 102. The LDU Engine 112 determines 608 whether it is necessary to execute the unit of work in TCB mode 310. According to the embodiment, the LDU Engine 112 determines 608 whether it is necessary to execute the unit of work in TCB mode 310 based on: instructions associated with the unit of work, characteristics of the unit of work and/or restrictions which prohibit the unit of work from being executed as a specialized unit of work (e.g. legal restrictions). In some embodiments, the LDU Engine 112 determines 608 whether to execute the unit of work in TCB Mode 310 by determining whether an exception occurs when the LDU Engine attempts to execute the unit of work in SRB Mode 320.

If the LDU Engine 112 determines 608 that it is necessary to execute the unit of work in TCB Mode 310, the LDU Engine 112 determines 610 whether a mode switch is necessary to switch to TCB Mode 310 based on status flag data element stored in the status flag storage 309. If the LDU Engine 112 determines 610 that a mode switch is necessary, then the LDU Engine 112 switches 612 to TCB mode 310. If the LDU Engine 112 determines 610 that a mode switch is not necessary, the LDU Engine 112 continues to operate in TCB mode 310. The LDU Engine 112 dispatches 616 the unit of work in TCB Mode 310.

If the LDU Engine 112 determines 608 that the unit of work could be executed as a specialized unit of work in SRB mode 320, the LDU Engine 112 determines 611 whether it is necessary to switch to SRB mode 320 based on the status flag data element stored in the status flag storage 309. If the LDU Engine 112 determines 611 that a mode switch is necessary, then the LDU Engine 112 switches 614 to SRB Mode 320. If the LDU Engine 112 determines 611 that a mode switch is not necessary, the LDU Engine 112 continues to operate in SRB Mode 320. The LDU Engine 112 dispatches 618 the unit of work in SRB Mode 320.

Figure 7A:
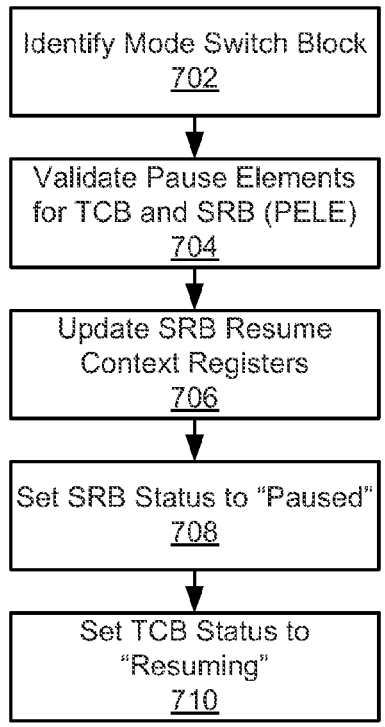
FIG. 7a is a flow chart illustrating steps performed by the Logical Dispatchable Unit Engine to switch from a Service Request Block (SRB) mode to a Task Control Block (TCB) mode according to one embodiment.

FIG. 7a is a flow chart illustrating steps performed by the LDU Engine 112 to switch from SRB mode 320 to TCB mode 310 according to one embodiment. Other embodiments perform the illustrated steps in different orders, and/or perform different or additional steps. Moreover, some of the steps can be performed by engines or modules other than the LDU Engine 112.

The LDU Engine 112 identifies 702 the data elements stored in the Mode Switch Block 205. The LDU Engine 112 validates 704 the pause element data objects referenced by the pointer data elements in the SRB Pause Element Storage 420 and the TCB Pause Element Storage 422. The LDU Engine 112 updates 706 the SRB Mode Resume Context Registers 430 with current run-time environment information. The LDU Engine 112 sets 708 the status flag in the status flag storage 409 to indicate that the SRB mode 320 is "paused." The LDU Engine 112 further sets 710 a status flag in the status flag storage 409 to indicate that the TCB mode 310 is "resuming."

Figure 7B:
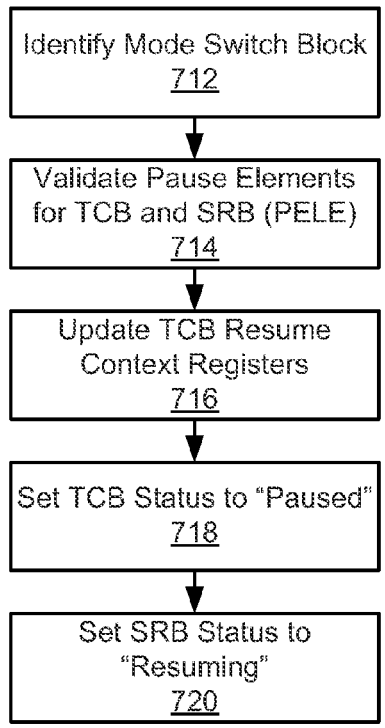
FIG. 7b is a flow chart illustrating steps performed by the Logical Dispatchable Unit Engine to switch from TCB mode to SRB mode according to one embodiment.

FIG. 7b is a flow chart illustrating steps performed by the LDU Engine 112 to switch from TCB mode 310 to SRB mode 320 to one embodiment. Other embodiments perform the illustrated steps in different orders, and/or perform different or additional steps. Moreover, some of the steps can be performed by engines or modules other than the LDU Engine 112.

The LDU Engine 112 identifies 712 the data elements stored in the Mode Switch Block 205. The LDU Engine 112 validates 714 the pause element data objects referenced by the pointer data elements in the SRB Pause Element Storage 420 and the TCB Pause Element Storage 422. The LDU Engine 112 updates 716 the TCB Mode Resume Context Registers 432 with current run-time environment information. The LDU Engine 112 sets 718 the status flag in the status flag storage 409 to indicate that the TCB mode 310 is "paused." The LDU Engine 112 further sets 720 a status flag in the status flag storage 409 to indicate that the SRB mode 320 is "resuming."

Figure 8:
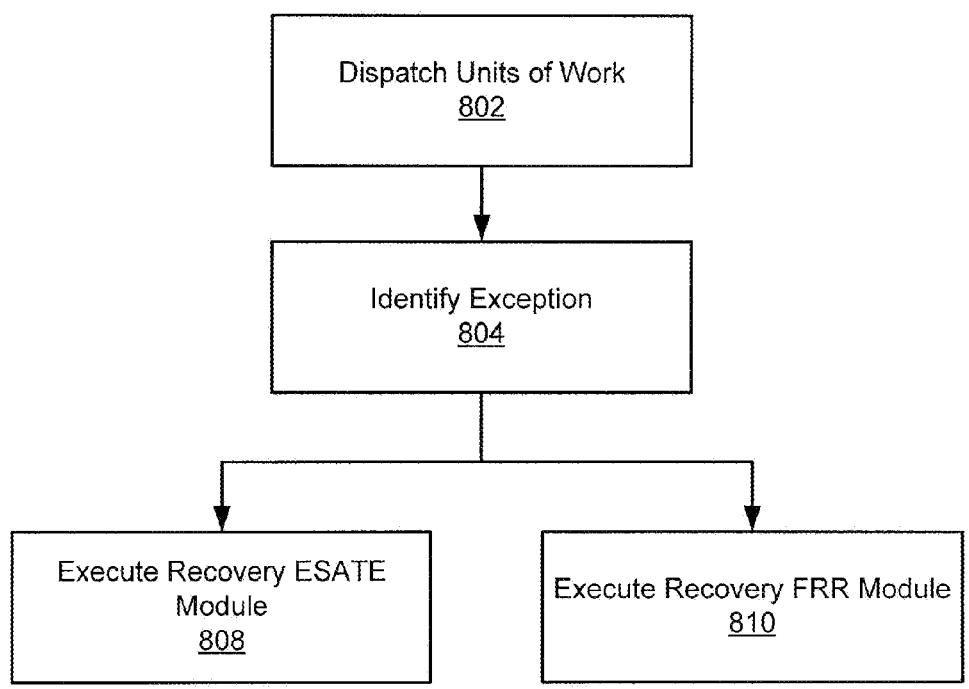
FIG. 8 is a flow chart illustrating steps performed the Logical Dispatchable Unit Engine to handle exceptions according to one embodiment.

FIG. 8 is a flow chart illustrating steps performed the LDU Engine 112 to handle exceptions according to one embodiment. Other embodiments perform the illustrated steps in different orders, and/or perform different or additional steps. Moreover, some of the steps can be performed by engines or modules other than the LDU Engine 112.

The LDU Engine 112 identifies and dispatches 802 units of work in TCB Mode 310 or in SRB Mode 320. The LDU Engine 112 communicates with the Operating System kernel 108 to determine 804 that an exception has occurred in association with a unit of work. If the LDU Engine 112 is executing in TCB mode 310, the LDU Engine 112 executes 808 the Recovery ESTAE Module 214. The Recovery ESTAE Module 214 communicates with the Operating System kernel 108 to execute a recovery procedure based on the exception. If the LDU Engine 112 is executing in SRB mode 320, the LDU Engine 112 executes 810 the Recovery FRR Module 224. The Recovery FRR Module 224 communicates with the Operating System kernel 108 to execute a recovery procedure based on the exception.

Figure 9:
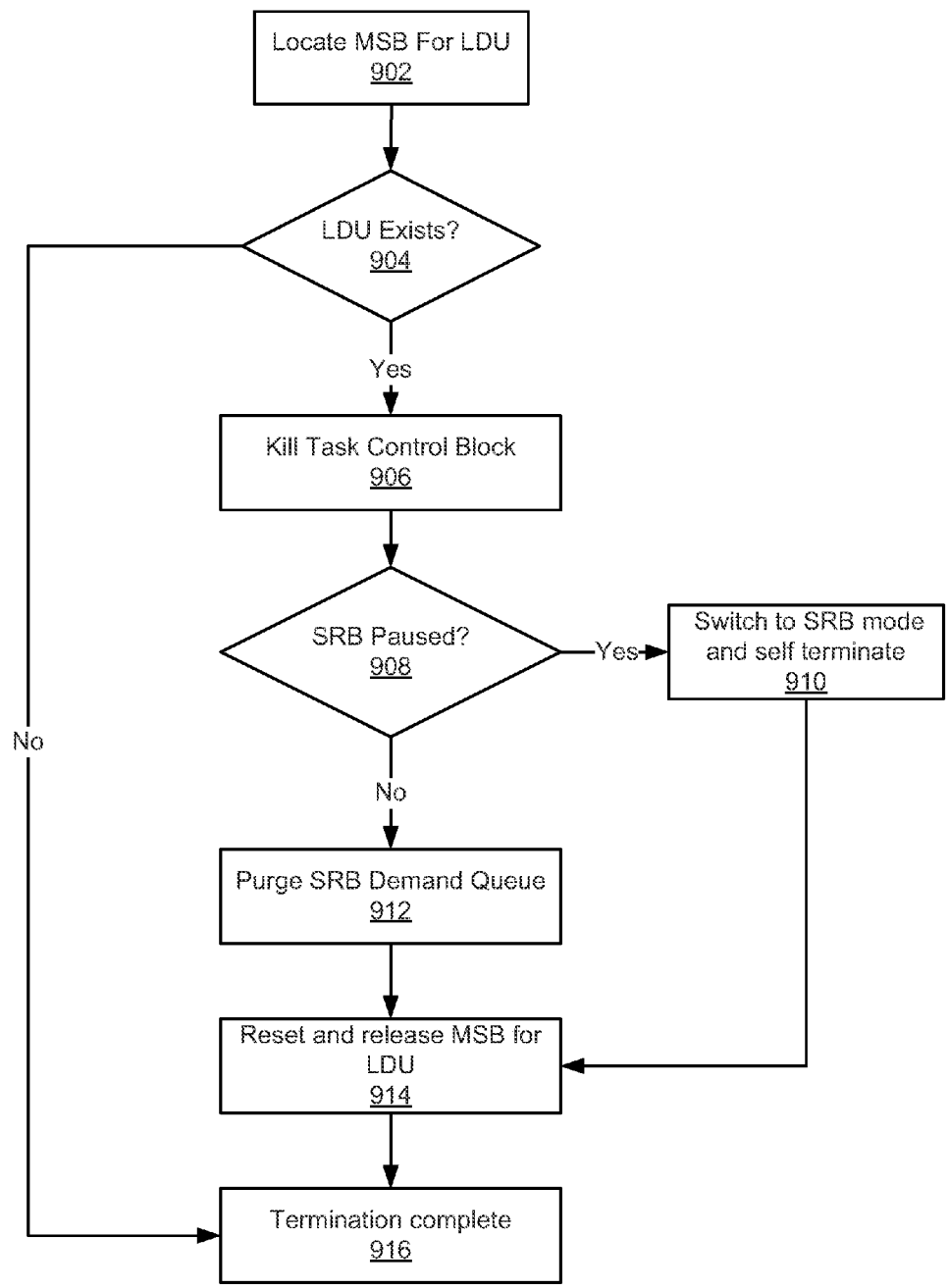
FIG. 9 is a flow chart illustrating steps performed the Logical Dispatchable Unit Engine to terminate execution according to one embodiment.

FIG. 9 is a flow chart illustrating steps performed the LDU Engine 112 to terminate execution according to one embodiment. Other embodiments perform the illustrated steps in different orders, and/or perform different or additional steps. Moreover, some of the steps can be performed by engines or modules other than the LDU Engine 112.

The LDU Engine 112 locates 902 the Mode Switch Block 205 for the LDU Engine 112. The LDU Engine 112 determines 904 whether the LDU Engine 112 exists based on locating 902 the Mode Switch Block 205. If the LDU Engine 112 is unable to locate 902 the Mode Switch Block 205, the LDU Engine 112 does not exist and the termination is complete 916.

If the LDU Engine 112 locates 902 the Mode Switch Block 205, the LDU Engine 112 is determined 904 to exist. If the LDU Engine 112 is determined 904 to exist, the LDU Engine 112 communicates with the Operating System kernel 108 to kill 906 the Task Control Block 332 referenced by the CMTC 342. The LDU Engine 112 determines 908 whether a unit of work has been paused in SRB mode 320 based on the status flags stored in the Status Flag Storage 409. If the LDU Engine 112 determines 908 that a unit of work has been paused in SRB mode 320, the LDU Engine 112 communicates with the operating system kernel 108 to request self-termination 910 of the SRB 352 associated with the unit of work. If the LDU Engine 112 determines 908 that a unit of work has been not paused in SRB mode 320 and the SRB 352 associated with the unit of work cannot be self-terminated, the LDU Engine 112 communicates with the operating system kernel 108 to make a "purge demand queue" call 912 to terminate the SRB 352. The LDU Engine 112 communicates with the operating system kernel 108 to release and reset 914 the memory 101 associated with the Mode Switch Block 205 for the LDU Engine 112 before completing 916 the termination of the LDU Engine 112.

The invention claimed is:

1. A computer-implemented method comprising:
   identifying a first unit of work to be executed;
   determining whether the first unit of work is to be dispatched to a general processor or a first specialty engine, the first specialty engine and the general processor differing in hardware, the first specialty engine optimized to execute a specific subset of units of work and not able to, and non-configurable to, execute other units of work executable by the general processor, the other units of work not belonging to the specific subset of units of work;
   communicating with an operating system kernel to dispatch the first unit of work for execution by the first specialty engine responsive to determining that the first unit of work is to be dispatched to the first specialty engine;
   determining whether an exception has occurred; and
   responsive to determining the exception has occurred, communicating with the operating system kernel to determine which of (1) restarting execution of a series of instructions associated with the first unit of work at a defined retry point in the series of instructions using one of the general processor and a second specialty engine and (2) continuing execution of the series of instructions until reaching a defined exit point in the series of instructions to perform.

2. The method of claim 1, further comprising:
   initializing a mode switch block, wherein the mode switch block comprises data elements used to dispatch the first unit of work for execution; and
   updating one or more data elements in the mode switch block, responsive to determining whether the first unit of work is to be dispatched to the general processor or the first specialty engine.

3. The method of claim 1, further comprising:
   switching from a first mode of operation to a second mode of operation responsive to determining that the first unit of work is to be dispatched to the general processor to restart executing the series of instructions at a defined retry point, wherein the first mode of operation specifies that the first unit of work is dispatched to the first specialty engine for execution and the second mode of operation specifies that the first unit of work is dispatched to the general processor for execution; and
   communicating with the operating system kernel to dispatch the first unit of work in the second mode of operation.

4. The method of claim 3, wherein communicating with the operating system kernel to dispatch the first unit of work in the second mode of operation comprises:
   monitoring the first unit of work dispatched to the general processor to restart execution of the series of instructions at the defined retry point;
   identifying an exception associated with the first unit of work dispatched to the general processor to restart execution of the series of instructions at the defined retry point; and
   communicating with the operating system kernel to perform a recovery procedure responsive to identifying the exception associated with the first unit of work dispatched to the general processor to restart execution of the series of instructions at the defined retry point.

5. The method of claim 3, wherein communicating with the operating system kernel to dispatch the first unit of work in the second mode of operation comprises:
   identifying a task control block generated by the operating system kernel, wherein the task control block stores information describing the execution of the first unit of work; and
   generating a task control block monitoring data element, wherein the task control block monitoring data element monitors the information stored in the task control block.

6. The method of claim 3, wherein switching from the first mode of operation to the second mode of operation comprises:
   updating a context register associated with the first mode of operation based on a current run-time environment, wherein the context register indicates a run-time context specific to the first mode of operation.

7. The method of claim 1, wherein communicating with the operating system kernel to dispatch the first unit of work for execution further comprises:
   switching from a first mode of operation to a second mode of operation responsive to determining that the first unit of work is to be dispatched to the first specialty engine, wherein the first mode of operation specifies that the first unit of work is dispatched to the general processor for execution and the second mode of operation specifies that the first unit of work is dispatched to the first specialty engine for execution; and
   communicating with the operating system kernel to dispatch the first unit of work in the second mode of operation.

8. The method of claim 7, wherein communicating with the operating system kernel to dispatch the first unit of work in the second mode of operation further comprises:
   monitoring the first unit of work dispatched to the first specialty engine for execution;
   identifying the exception associated with the first unit of work dispatched to the first specialty engine for execution; and
   communicating with the operating system kernel to perform a recovery procedure responsive to identifying the exception associated with the first unit of work.

9. The method of claim 7, wherein switching from the first mode of operation to the second mode of operation comprises:

updating a context register associated with the first mode of operation based on a current run-time environment, wherein the context register indicates a run-time context specific to the first mode of operation.

10. The method of claim 7, wherein communicating with the operating system kernel to dispatch the first unit of work in the second mode of operation comprises:
communicating with the operating system kernel to generate a service request block, wherein the service request block stores information describing the execution of the first unit of work.

11. The method of claim 10, further comprising:
generating a service request block pointer data element, wherein the service request block pointer data element specifies an address in a memory associated with the service request block; and
storing the service request block pointer data element.

12. The method of claim 1, wherein identifying the first unit of work to be executed comprises receiving the first unit of work from an application server in a format associated with a service-oriented architecture.

13. The method of claim 1, wherein determining whether the first unit of work is to be dispatched to the general processor or the first specialty engine comprises determining whether the first unit of work may not be executed on the first specialty engine.

14. The method of claim 1, wherein determining whether the first unit of work is to be executed on the first specialty engine comprises one of: determining legal restrictions associated with the first unit of work, determining characteristics associated with the first unit of work, and determining instructions associated with the first unit of work.

15. A system comprising:
one or more general processors;
one or more specialty engines, the one or more specialty engines and the one or more general processors differing in hardware, wherein the one or more specialty engines are optimized to execute a specific subset of units of work and are not able to, and non-configurable to, execute other units of work executable by the one or more general processors, the other units of work not belonging to the specific subset of units of work;
an operating system kernel; and
a memory storing instructions that, upon execution, cause the system to:
determine whether a first unit of work is to be dispatched to one of the one or more general processors or one of the one or more specialty engines;
communicate with the operating system kernel to dispatch the first unit of work to a first specialty engine for execution responsive to determining that the first unit of work is to be dispatched to the first specialty engine;
determine whether an exception has occurred; and
responsive to determining the exception has occurred, communicate with the operating system kernel to determine which of (1) restarting execution of a series of instructions associated with the first unit of work at a defined retry point in the series of instructions using one of a general processor and a second specialty engine and (2) continuing execution of the series of instructions until reaching a defined exit point in the series of instructions to perform.

16. The system of claim 15, wherein the instructions stored by the memory, when executed, further cause the system to:
store data elements used to dispatch one or more units of work to the one or more general processors and the one or more specialty engines for execution.

17. The system of claim 16, wherein the instructions stored by the memory, when executed, further cause the system to:
execute a first mode of operation including communicating with the operating system kernel to dispatch a first set of the one or more units of work to the one or more general processors; and
store a data element that indicates execution in the first mode of operation.

18. The system of claim 16, wherein the instructions stored by the memory, when executed, further cause the system to:
execute a second mode of operation including communicating with the operating system kernel to dispatch a second set of the one or more units of work to the one or more specialty engines; and
store a data element that indicates execution in the second mode of operation.

19. The system of claim 16, wherein the instructions stored by the memory, when executed, further cause the system to:
store data elements used to monitor the one or more units of work that the one or more general processors and the one or more specialty engines execute.

20. The system of claim 15, wherein the instructions stored by the memory, when executed, further cause the system to:
identify an exception associated with a unit of work dispatched to a first general processor from the one or more general processors; and
communicate with the operating system kernel to perform an extended specify task abnormal exit recovery procedure based on the exception associated with the unit of work dispatched to the first general processor.

21. The system of claim 15, wherein the instructions stored by the memory, when executed, further cause the system to:
identify the exception associated with the first unit of work dispatched to the first specialty engine from the one or more specialty engines; and
communicate with the operating system kernel to perform a functional recovery routine recovery procedure based on the exception.

22. A non-transitory computer readable storage medium comprising executable program code for a logical dispatchable unit engine, the executable program code for the logical dispatchable unit engine comprising program code for:
identifying a first unit of work to be executed;
determining whether the first unit of work is to be dispatched to a general processor or a first specialty engine, the first specialty engine and the general processor differing in hardware, the first specialty engine optimized to execute a specific subset of units of work and not able to, and non-configurable to, execute other units of work executable by the general processor, the other units of work not belonging to the specific subset of units of work;
communicating with an operating system kernel to dispatch the first unit of work for execution by the first specialty engine responsive to determining that the first unit of work is to be dispatched to the first specialty engine;
determining whether an exception has occurred; and responsive to determining the exception has occurred, communicating with the operating system kernel to determine which of (1) restarting execution of a series of instructions associated with the first unit of work at a defined retry point in the series of instructions using one of the general processor and a second specialty engine and (2) continuing execution of the series of instructions until reaching a defined exit point in the series of instructions to perform.

23. The non-transitory computer readable storage medium of claim 22, wherein the program code for the logical dispatchable unit engine comprises program code for:
initializing a mode switch block, wherein the mode switch block comprises data elements used to communicate with the operating system kernel to dispatch the first unit of work for execution.

24. The non-transitory computer readable storage medium of claim 23, wherein the program code for initializing the mode switch block comprises program code for:
identifying a task control block generated by the operating system kernel, the task control block comprising information associated with the execution of the first unit of work; and
generating a data element to monitor the task control block.

25. The non-transitory computer readable storage medium of claim 23, wherein the program code for initializing the mode switch block comprises program code for:
generating a first data element that uniquely identifies the local dispatchable unit engine; and
storing the first data element in the mode switch block.

26. The non-transitory computer readable storage medium of claim 23, wherein the program code for initializing the mode switch block comprises program code for:
generating one or more data elements referencing information used to pause an executing unit of work; and
storing the one or more data elements referencing information used to pause the executing unit of work in the mode switch block.

27. The non-transitory computer readable storage medium of claim 23, wherein the program code for initializing the mode switch block comprises program code for:
initializing one or more status flags to indicate the logical dispatchable unit engine is operating in a first mode of operation, wherein the one or more status flags indicate whether the logical dispatchable unit engine is operating in the first mode of operation wherein the first unit of work is dispatched to the first specialty engine for execution or a second mode of operation wherein the first unit of work is dispatched to the general processor for execution.

28. The non-transitory computer readable storage medium of claim 27, wherein the program code for initializing the mode switch block comprises program code for:
initializing a context register associated with the first mode of operation based on a current run-time environment, wherein the context register indicates a run-time context specific to the first mode of operation; and
storing run-time context information in the context register associated with the first mode of operation in the mode switch block.

29. The non-transitory computer readable storage medium of claim 27, wherein the program code for communicating with the operating system kernel to dispatch the first unit of work for execution further comprises:
identifying a status flag from the one or more status flags stored in the mode switch block that indicates the logical dispatchable unit engine is operating in the second mode of operation; and
determining whether to switch from the second mode of operation to the first mode of operation.

30. The non-transitory computer readable storage medium of claim 27, wherein the program code for communicating with the operating system kernel to dispatch the first unit of work for execution further comprises:
identifying a status flag from the one or more status flags stored in the mode switch block that indicates the logical dispatchable unit engine is operating in the first mode of operation; and
determining whether to switch from the first mode of operation to the second mode of operation.

31. The non-transitory computer readable storage medium of claim 23, wherein the program code for communicating with the operating system kernel to dispatch the first unit of work in a second mode of operation comprises:
communicating with the operating system kernel to generate a service request block, wherein the service request block stores information describing the execution of the first unit of work.

32. The non-transitory computer readable storage medium of claim 31, further comprising:
generating a service request block pointer data element, wherein the service request block pointer data element specifies an address in a memory associated with the service request block; and
storing the service request block pointer data element in the mode switch block.

33. The non-transitory computer readable storage medium of claim 22, wherein the program code for the logical dispatchable unit engine comprises program code for a recovery extended specify task abnormal exit module comprising program code for:
identifying an exception associated with the first unit of work dispatched to the general processor to restart execution of the series of instructions at the defined retry point; and
communicating with the operating system kernel to perform a recovery extended specify task abnormal exit procedure responsive to identifying the exception associated with the first unit of work dispatched to the general processor to restart execution of the series of instructions at the defined retry point.

34. The non-transitory computer readable storage medium of claim 22, wherein the program code for the logical dispatchable unit engine comprises program code for a recovery functional recovery routine module comprising program code for:
identifying the exception associated with the first unit of work dispatched to the first specialty engine for execution; and
communicating with the operating system kernel to perform a recovery functional recovery routine procedure responsive to identifying the exception associated with the first unit of work.

* * * * *